US012691800B2

(12) United States Patent　　　(10) Patent No.: US 12,691,800 B2
Mchugh et al.　　　(45) Date of Patent: Jul. 28, 2026

(54) CHILD RESTRAINT

(71) Applicant: Dorel Juvenile Group, Inc., Foxboro, MA (US)

(72) Inventors: William P. Mchugh, Norfolk, MA (US); Jason H. Johnson, Brownstown, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 205 days.

(21) Appl. No.: 18/515,729

(22) Filed: Nov. 21, 2023

(65) Prior Publication Data

US 2024/0166101 A1　　May 23, 2024

Related U.S. Application Data

(60) Provisional application No. 63/426,848, filed on Nov. 21, 2022.

(51) Int. Cl.
B60N 2/28　　　(2006.01)

(52) U.S. Cl.
CPC ......... B60N 2/2821 (2013.01); B60N 2/2812 (2013.01); B60N 2/2824 (2013.01); B60N 2/2827 (2013.01); B60N 2/2869 (2013.01)

(58) Field of Classification Search
CPC .. B60N 2/2821; B60N 2/2824; B60N 2/2827; B60N 2/2812; B60N 2/2869
USPC ...................................................... 297/256.16
See application file for complete search history.

(56) References Cited

U.S. PATENT DOCUMENTS

| | | | | |
|---|---|---|---|---|
| 4,861,105 A | * | 8/1989 | Merten | ................. B62B 3/1444 |
| | | | | 297/130 |
| 5,385,387 A | * | 1/1995 | Kain | ...................... B60N 2/286 |
| | | | | 297/256.16 |
| 6,260,920 B1 | | 7/2001 | Tolfsen | |
| 6,318,807 B1 | | 11/2001 | Perego | |
| 6,428,099 B1 | * | 8/2002 | Kain | ................... B60N 2/2839 |
| | | | | 297/256.16 |
| 7,338,122 B2 | | 3/2008 | Hei | |
| 7,484,801 B2 | * | 2/2009 | Kassai | ..................... B60N 2/28 |
| | | | | 297/256.16 |
| 7,559,606 B2 | | 7/2009 | Hei | |
| 7,575,276 B1 | | 8/2009 | Henry | |
| 7,735,921 B2 | | 6/2010 | Hutchinson | |
| 7,770,970 B2 | | 8/2010 | Hei | |
| 7,828,381 B2 | | 11/2010 | Barger | |
| 7,887,129 B2 | | 2/2011 | Hei | |
| 8,235,465 B2 | | 8/2012 | Hei | |
| 8,256,841 B2 | | 9/2012 | Hei | |
| 8,317,265 B2 | | 11/2012 | Hutchinson | |

(Continued)

OTHER PUBLICATIONS

Office Action (Non-Final Rejection) dated Jun. 20, 2024 for U.S. Appl. No. 17/880,036, CO-1271 US-U II (pp. 1-11).

(Continued)

*Primary Examiner* — Milton Nelson, Jr.
(74) *Attorney, Agent, or Firm* — Barnes & Thornburg LLP

(57)　　　　　　ABSTRACT

A child restraint includes a seat base and a juvenile seat. The seat base is adapted to rest on a vehicle seat. The juvenile seat adapted to support a child and includes a seat bottom and a seat back arranged to extend upwardly away from the seat bottom. The child restraint further includes a juvenile-seat attachment system configured to mount the juvenile seat to the seat base.

20 Claims, 7 Drawing Sheets

(56) References Cited

U.S. PATENT DOCUMENTS

| | | | |
|---|---|---|---|
| 8,474,907 B2 * | 7/2013 | Weber | B60N 2/2851 |
| | | | 297/256.16 |
| 8,511,749 B2 | 8/2013 | Hei | |
| 9,090,182 B2 | 7/2015 | Rabeony | |
| 9,487,111 B2 | 11/2016 | Lake | |
| 10,457,168 B2 | 10/2019 | Anderson | |
| 10,464,451 B2 | 11/2019 | Stamper | |
| 10,583,756 B2 | 3/2020 | Anderson | |
| 10,688,892 B2 | 6/2020 | Anderson | |
| 10,710,478 B2 | 7/2020 | Reaves | |
| 11,420,540 B2 | 8/2022 | Williams | |
| 11,427,114 B2 | 8/2022 | Keegan | |
| 11,565,612 B2 | 1/2023 | Williams | |
| 12,077,069 B2 | 9/2024 | McHugh | |
| 2008/0224516 A1 | 9/2008 | Van Der Vegt | |
| 2009/0256406 A1 * | 10/2009 | Schrooten | B62B 7/142 |
| | | | 297/256.16 |
| 2016/0176320 A1 | 6/2016 | Williams | |
| 2019/0077282 A1 | 3/2019 | Reaves | |
| 2019/0135142 A1 | 5/2019 | Jung | |
| 2021/0237626 A1 | 8/2021 | Longenecker | |
| 2022/0048415 A1 | 2/2022 | Keegan | |
| 2022/0212575 A1 | 7/2022 | Williams | |
| 2022/0219581 A1 | 7/2022 | Brunick | |
| 2022/0242288 A1 | 8/2022 | Po-Jung | |
| 2022/0355713 A1 | 11/2022 | Longenecker | |
| 2023/0256875 A1 | 8/2023 | Da-Liang | |

OTHER PUBLICATIONS

Office Action (Non-Final Rejection) dated Dec. 8, 2023 for U.S. Appl. No. 17/882,031 (pp. 1-10).

Office Action (Non-Final Rejection) dated Apr. 7, 2026 for U.S. Appl. No. 18/812,038 (pp. 1-9).

* cited by examiner

CHILD RESTRAINT

PRIORITY CLAIM

This application claims priority under 35 U.S.C. § 119(e) to U.S. Provisional Patent Application No. 63/426,848, filed Nov. 21, 2022, which is expressly incorporated by reference herein in its entirety.

BACKGROUND

The present disclosure relates to a child restraint, and particularly to a child restraint including a seat base and a juvenile seat. More particularly, the present disclosure relates to a child restraint including a seat base and a juvenile seat that is at least partially removable from the seat base.

SUMMARY

According to the present disclosure, a child restraint includes a seat base adapted to rest on a vehicle seat and a juvenile seat adapted to mount to the seat base to secure the juvenile seat to the vehicle seat. The juvenile seat is at least partially separable from the seat base to expose a seatbelt retainer so that a vehicle seat belt can be routed across a belt path formed by the seat base and then clamped by the seatbelt retainer to secure the seat base to the vehicle seat.

In illustrative embodiments, the child restraint further includes a juvenile-seat attachment system coupled to both the seat base and the juvenile seat. The juvenile-seat attachment system is configured to mount the juvenile seat releasably to the seat base so that the juvenile seat is at least partially separable from the seat base.

In illustrative embodiments, the juvenile-seat attachment system includes an installation guide, a juvenile seat anchor, and an anchor lock. The installation guide is configured to guide a rear end of the juvenile seat onto the seat-orientation controller so that a front end of the juvenile seat is aligned with the juvenile seat anchor at a front end of the seat-orientation controller for proper installation. The juvenile seat anchor is configured to retain the front end of the juvenile seat to the seat orientation controller after the front end of the juvenile seat is lowered onto the seat-orientation controller. The anchor lock is configured to retain the juvenile seat anchor in a latched position to block separation of the juvenile seat from the seat base after the front end of the juvenile seat is installed on the seat-orientation controller.

The juvenile-seat attachment system is configured to provide means for separating the juvenile seat from the seat base in response to a pulling force on the seat-release handle coupled to the juvenile seat and a lifting force applied on the seat-release handle after application of the pulling force to cause the juvenile seat to unlock from the seat base and at least partially separate from the seat base without a user disengaging the release handle during application of the pulling force and the lifting force. In this way, the juvenile seat can be separated from the seat base without the user having to readjust their hands after application of the pulling force.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a child restraint including a seat base, a juvenile seat separated from the seat base, and a juvenile-seat attachment system configured to mount the juvenile seat to the seat base removeably so that the juvenile seat is at least partially separable from the seat base to expose a seatbelt retainer coupled to the seat base and configured to clamp a vehicle seat belt to install the seat base on a vehicle seat;

FIG. 2 is a perspective view similar to FIG. 1 with the juvenile seat in a different orientation to show that the juvenile seat attachment system includes an installation guide configured to guide a rear end of the juvenile seat onto the seat base, a juvenile seat anchor configured to retain juvenile seat to the seat base after a front end of the juvenile seat is lowered onto the seat base while the rear end of the juvenile seat remains in contact with the seat base by the installation guide, and an anchor latch configured to lock the juvenile seat anchor in a latched position, as shown in FIG. 8, to block separation of the juvenile seat from the seat base;

Figure 9:
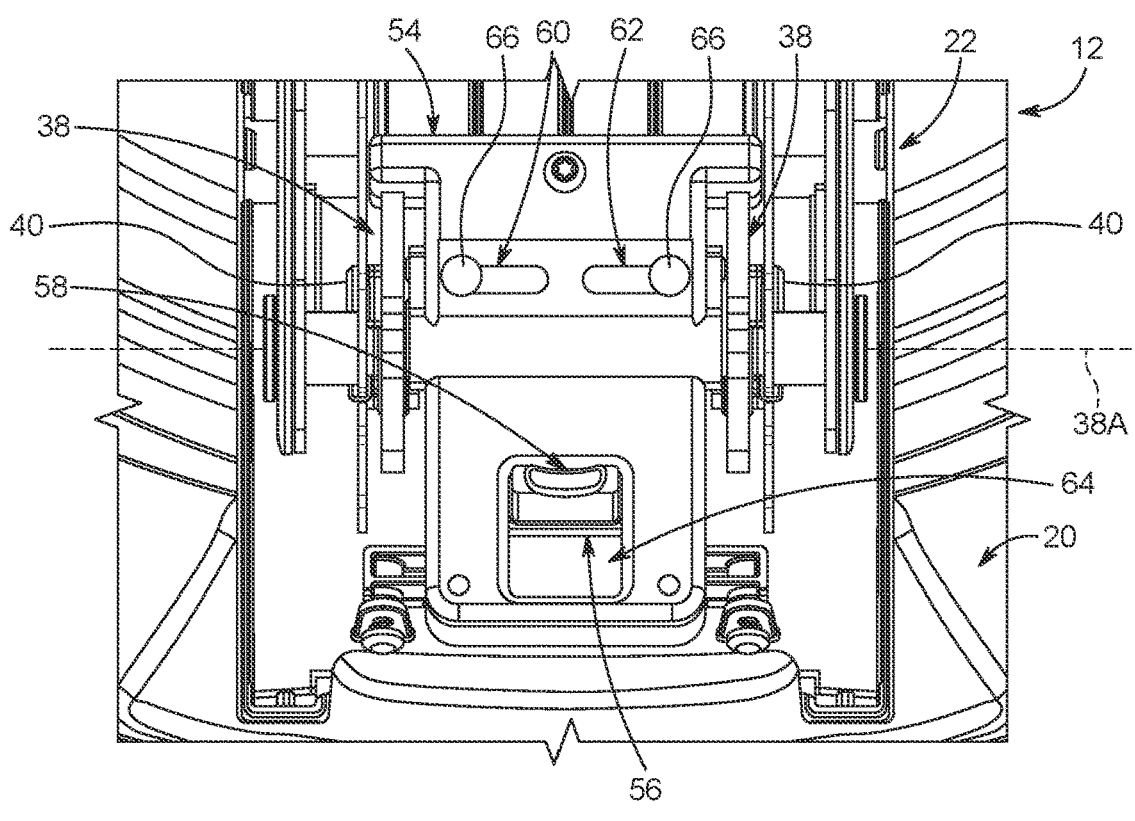
Figure 10:
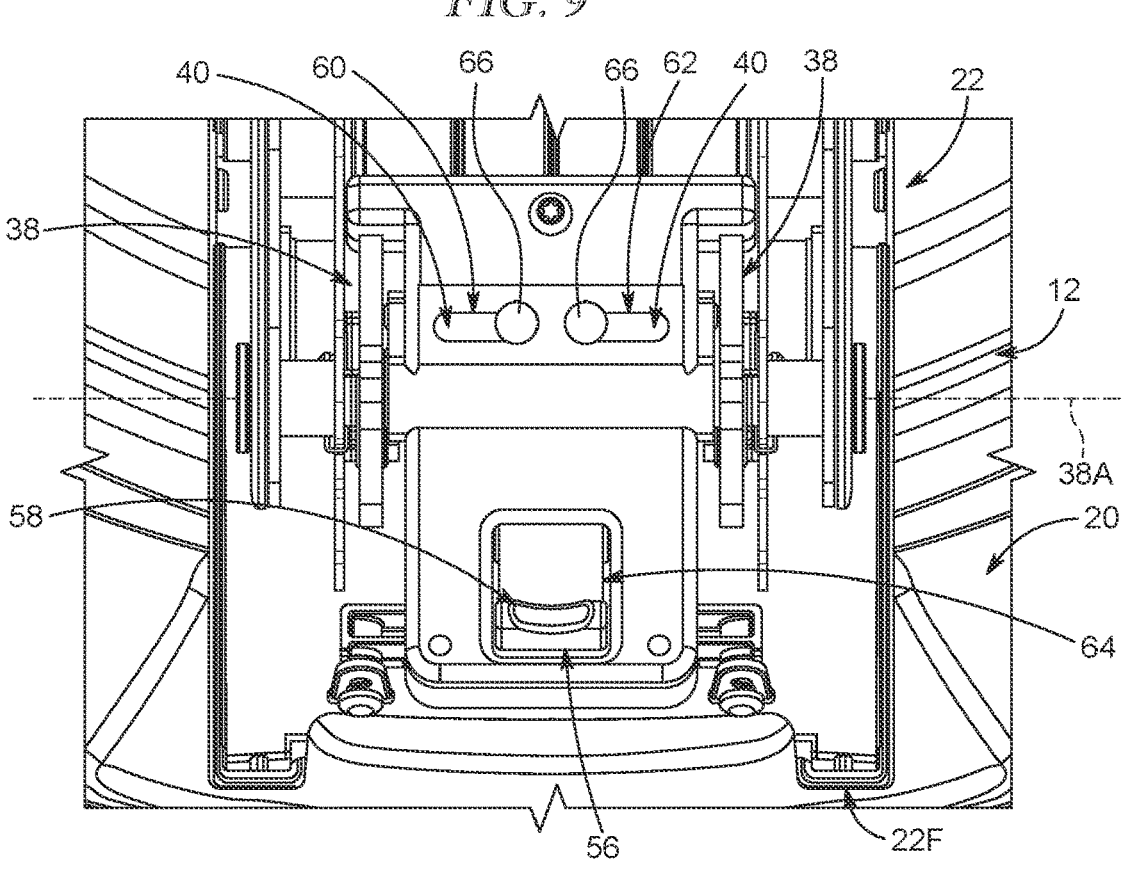
Figures 11, 12:
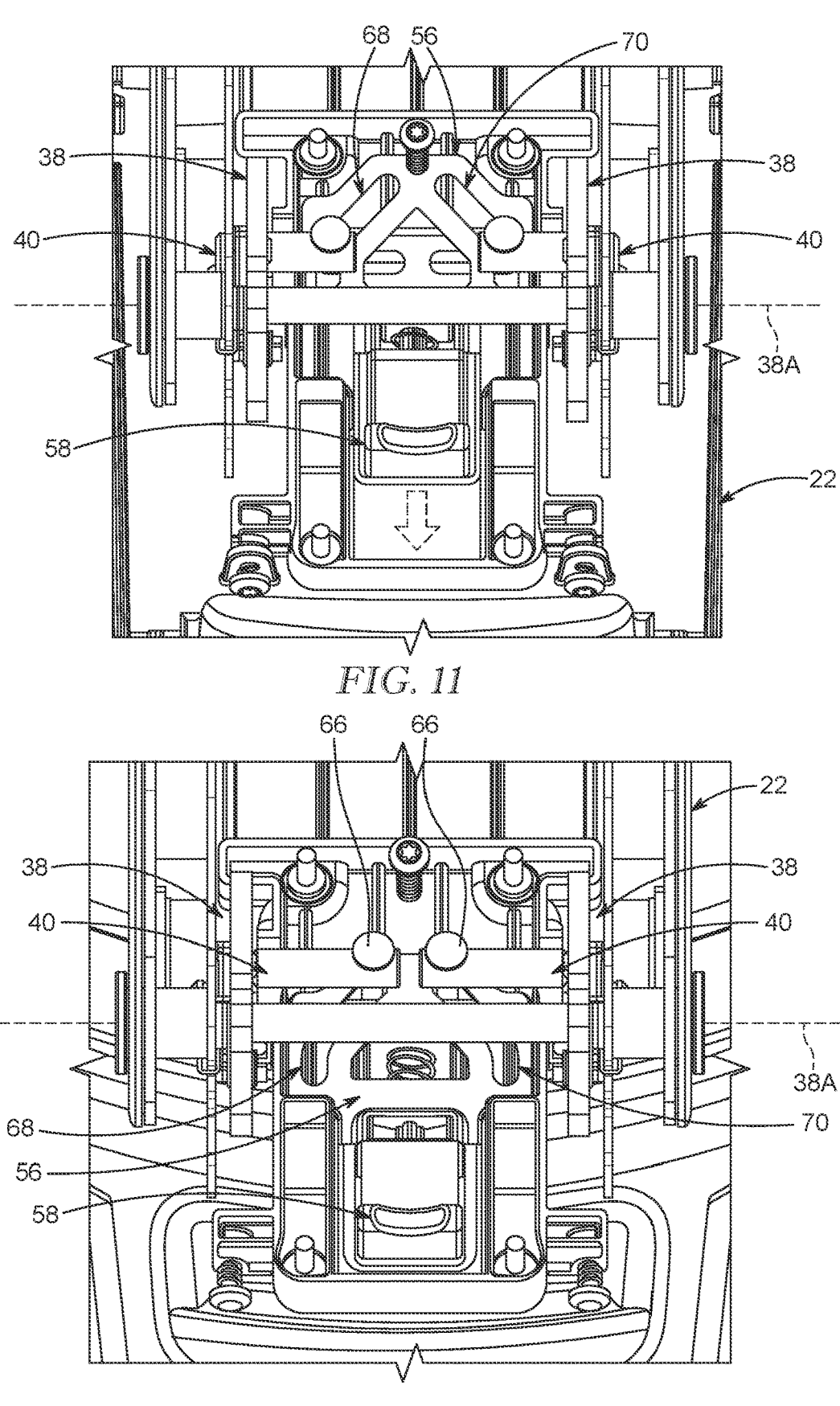

FIG. 9 is a top view of a portion of the seat base with a portion of the seat base removed to show that the anchor lock includes a lock-release controller having a controller housing, a cam plate residing within the controller housing, and a pair of lock pins biased into engagement with the anchor latches to lock the anchor latched in the latched position after the second juvenile-seat retainer is installed on the seat base;

FIG. 10 is a top view of a portion of the seat base similar to FIG. 9 showing the cam plate moved in a forward direction relative to the seat base to cause each of the lock pins to retract inwardly toward one another and disengage each of the anchor latches so that the anchor latches are free to return to the unlatched position and the juvenile seat can be lifted away from the seat base;

FIG. 11 is a top view of a portion of the seat base similar to FIG. 9 with a portion of the controller housing removed to expose the cam plate and show that the cam plate is formed to include a pair of angled actuator slots which receive respective guide pins included in each of the lock pins and configured to guide movement of the lock pins from a locked position engaged with each of the anchor latches, as shown in FIG. 11, to an unlocked position disengaged from each of the anchor latches, as shown in FIG. 12; and FIG. 12 is a top view of a portion of the seat base similar to FIG. 11 showing the cam plate moved in the forward direction and the lock pins retracted inwardly away from each of the anchor latches.

DETAILED DESCRIPTION

Figure 1:
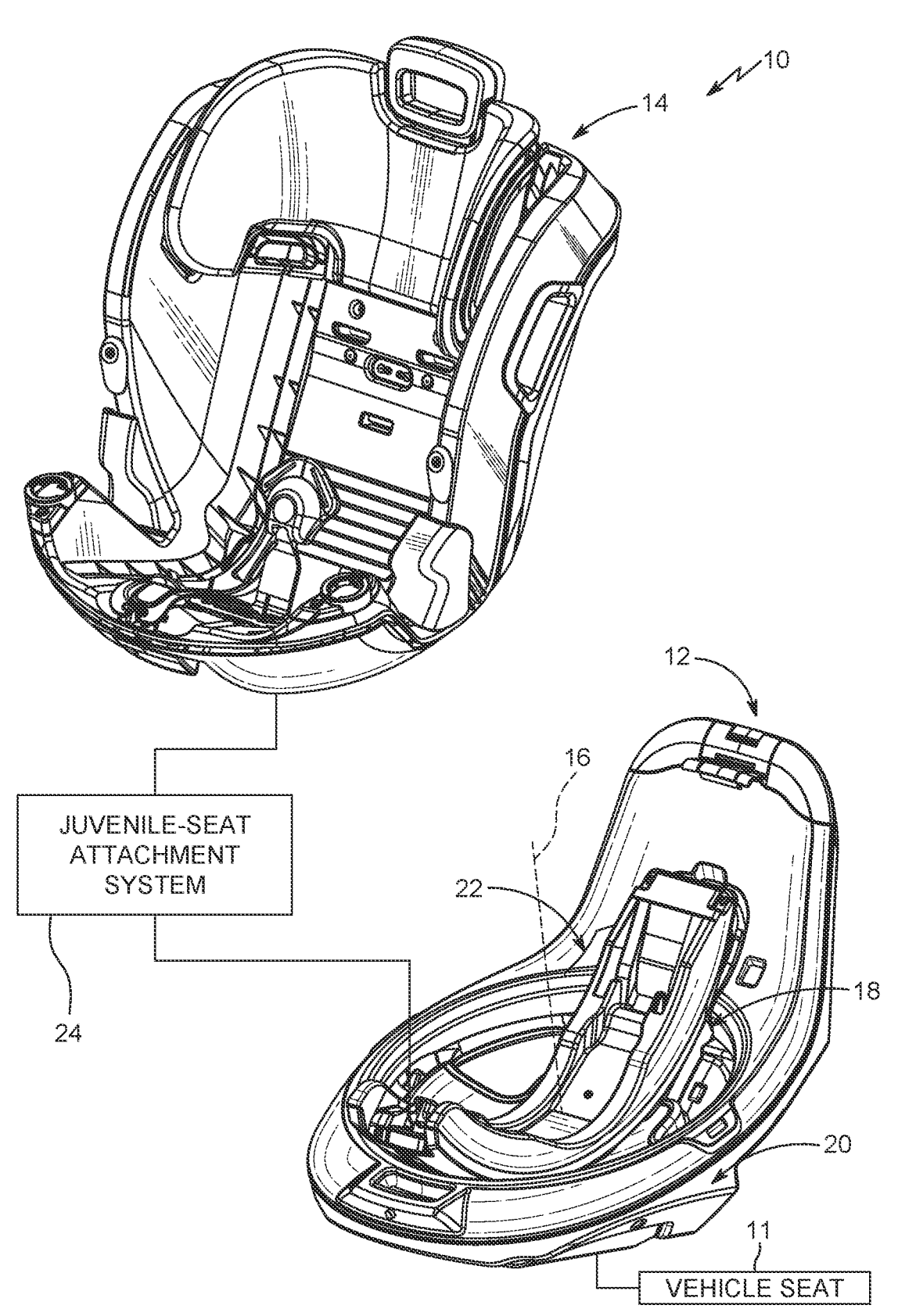

A child restraint 10 includes a seat base 12 adapted to rest on a vehicle seat 11 and a juvenile seat 14 adapted to mount to the seat base 12 to secure the juvenile seat 14 to the vehicle seat 11 as shown in FIG. 1. The juvenile seat 14 is at least partially separable from the seat base 12 to expose a seat-belt retainer 18 so that a vehicle seat belt can be routed across a belt path formed by the seat base 12 and then clamped by the seat-belt retainer 18 to secure the seat base 12 to the vehicle seat 11. Once installed, the juvenile seat 14 is rotatable relative to the seat base 12 about a vertical rotation axis 16 to arrange the juvenile seat 14 in a forward seating arrangement or a rearward seating arrangement.

The seat base 12 includes a seat-base foundation 20 and a seat-orientation controller 22 that is configured to mount the juvenile seat 14 to the seat base 12 and control movement of the juvenile seat 14 relative to the seat base 12. The seat-orientation controller 22 is fixed to the seat base 12 and is rotatable about the vertical rotation axis 16 in unison with the juvenile seat 14 when the juvenile seat 14 is mounted on the seat-orientation controller 18. The seat orientation controller 22 includes features that allow the juvenile seat to rotate and recline relative to the seat base 12.

Figure 2:
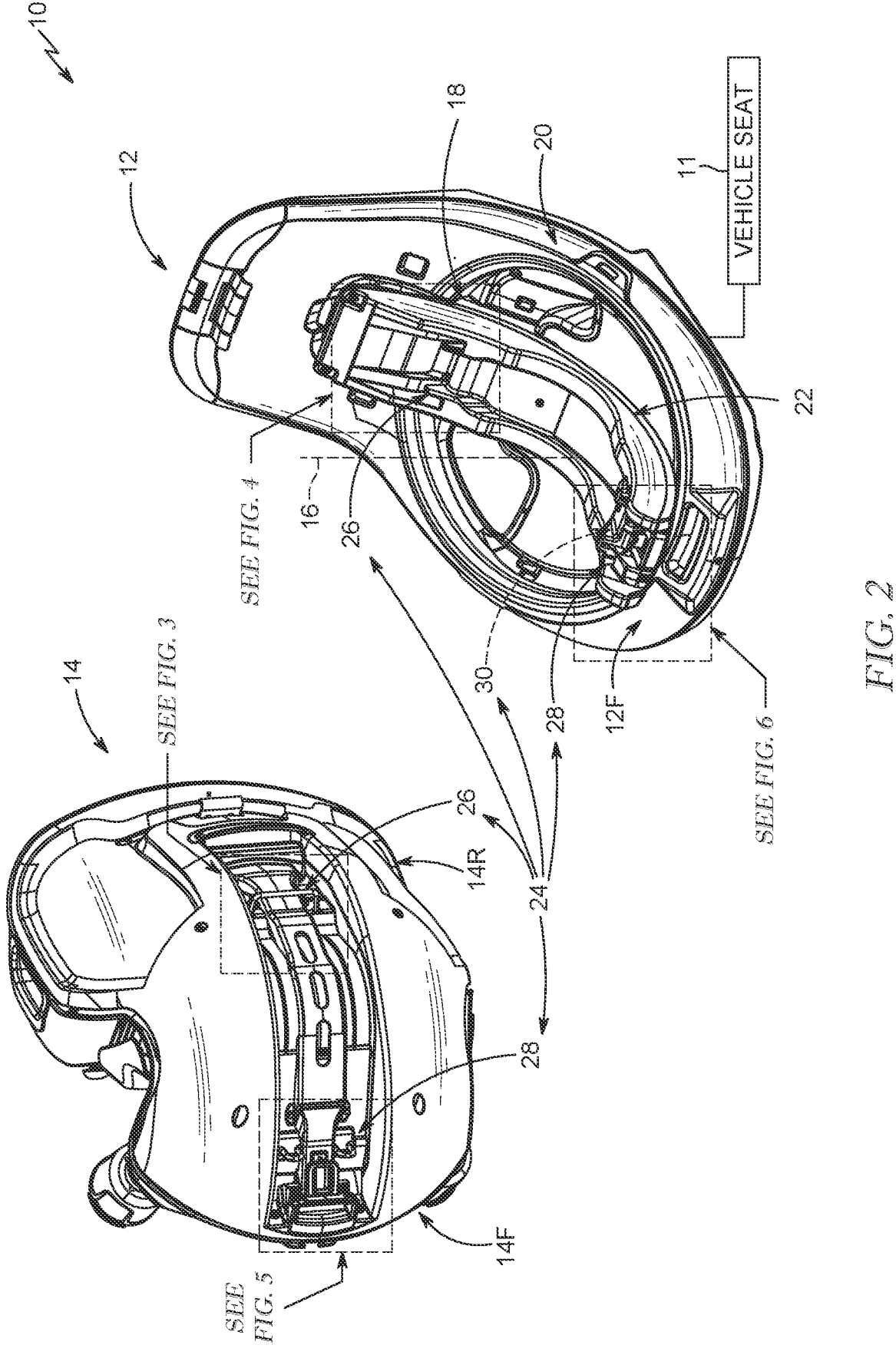

In illustrative embodiments, the child restraint 10 further includes a juvenile-seat attachment system 24 coupled to both the seat base 12 and the juvenile seat as shown in FIG. 2. The juvenile-seat attachment system 24 is configured to mount the juvenile seat 14 releasably to the seat base 12 so that the juvenile seat 14 is at least partially separable from the seat base 12.

The juvenile-seat attachment system 24 includes an installation guide 26, a juvenile seat anchor 28, and an anchor lock 30 as shown in FIGS. 2-6. The installation guide 26 is configured to guide a rear end 14R of the juvenile seat 14 onto the seat-orientation controller 22 so that a front end 14F of the juvenile seat 14 is aligned with a front end 12F of the seat-orientation controller 22 for proper installation. The juvenile seat anchor 28 is configured to retain the front end 14F of the juvenile seat 14 to the seat orientation controller 22 after the front end 14F of the juvenile seat 14 is lowered onto the seat-orientation controller 22. The anchor lock 30 is configured to retain the juvenile seat anchor 28 in a latched position to block separation of the juvenile seat 14 from the seat base 12 after the front end 14F of the juvenile seat 14 is installed on the seat-orientation controller 22.

Figure 3:
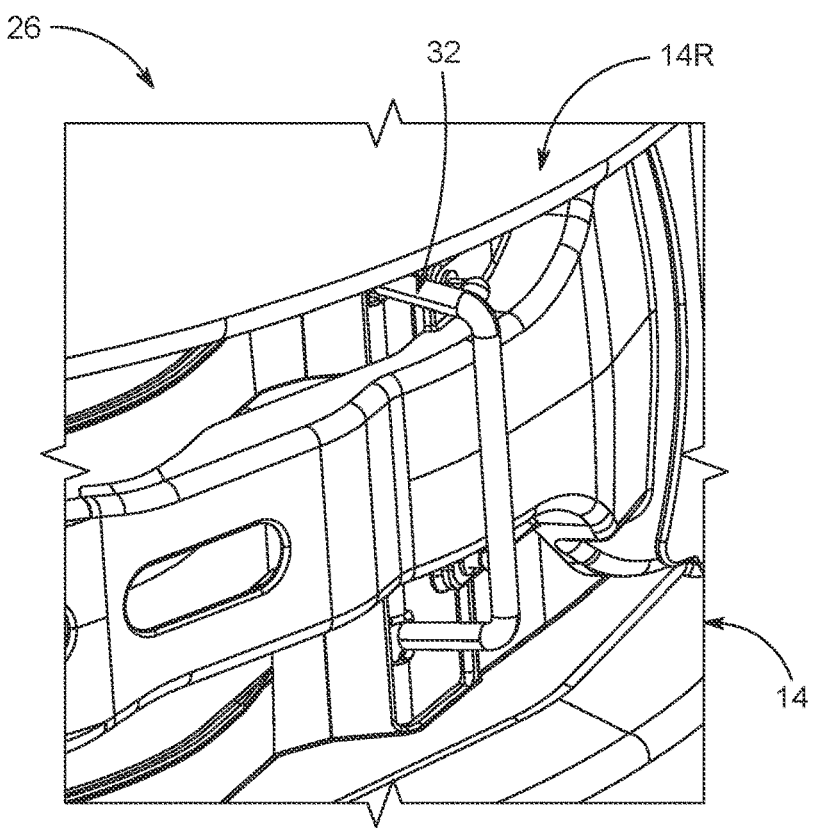
FIG. 3 is an enlarged view of a portion of FIG. 2 showing that the installation guide includes a first juvenile seat retainer in the form of a u-shaped bar.
Figure 4:
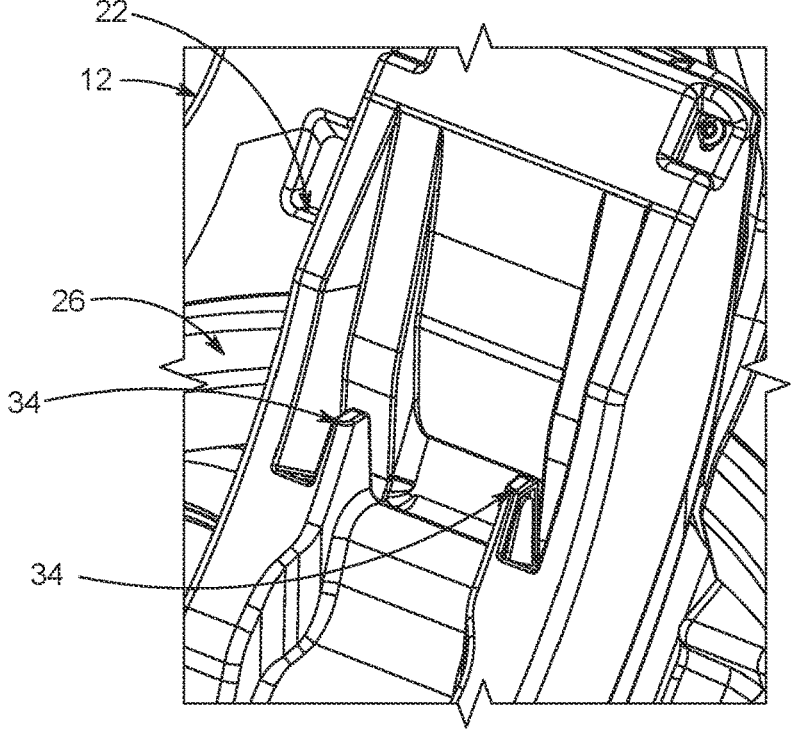
FIG. 4 is an enlarged view of a portion of FIG. 2 showing that the installation guide further includes a pair of guide posts configured to extend into a space between an underside of the juvenile seat and a portion of the first juvenile seat retainer after the rear end of the juvenile seat has been lowered onto the seat base.

The installation guide 26 includes a first juvenile-seat retainer 32 coupled to an underside of the juvenile seat 14 and a pair of guide posts 34 coupled to a topside of the seat-orientation controller 22 as shown in FIGS. 3 and 4. The first juvenile-seat retainer 32 includes a u-shaped bar that is sized to capture the guide posts 34 when the rear end 14R of the juvenile seat 14 is lowered onto the seat orientation controller 22. The guide posts 34 are configured to engage the first juvenile-seat retainer 32 when the rear end 14R of the juvenile seat 14 is installed on the seat base 12 and cooperate with the juvenile seat anchor 28 to retain the juvenile seat 14 to the seat base 12. In some embodiments, the installation guide 26 may include on one guide post 34.

Figure 5:
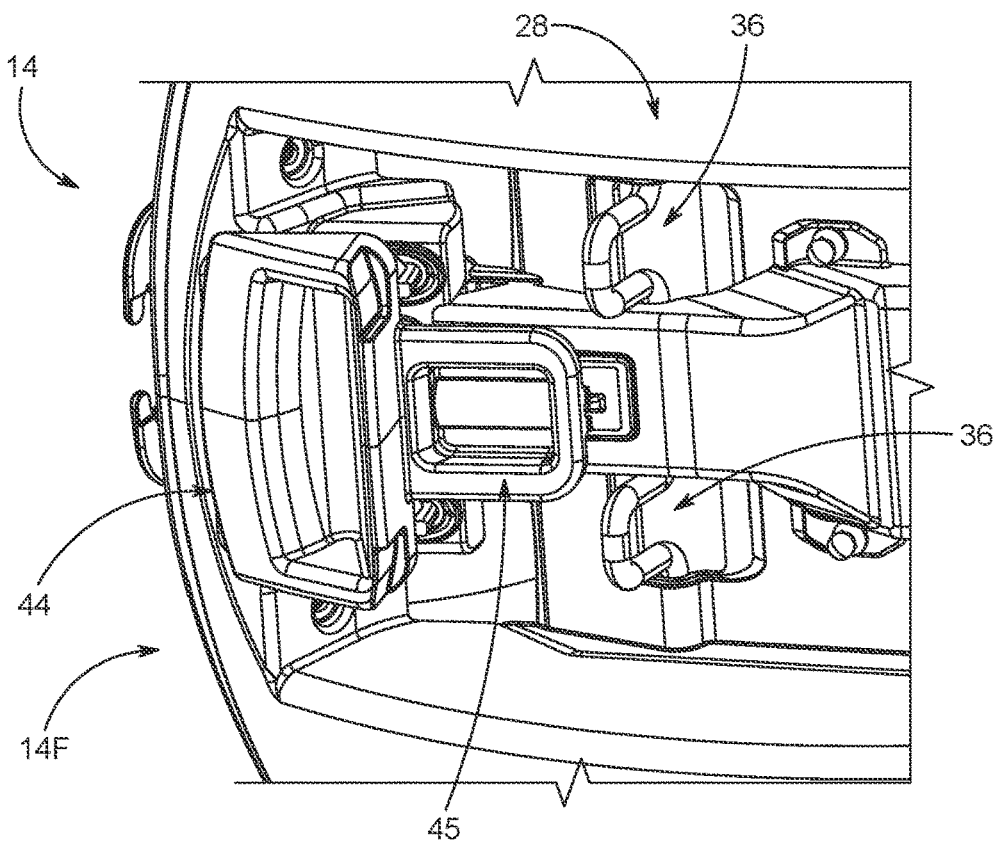
FIG. 5 is an enlarged view of a portion of FIG. 2 showing that the juvenile seat anchor includes a second juvenile seat retainer in the form of a pair of u-shaped bars and showing that the anchor lock includes a release handle coupled to a front end of the juvenile seat.
Figure 6:
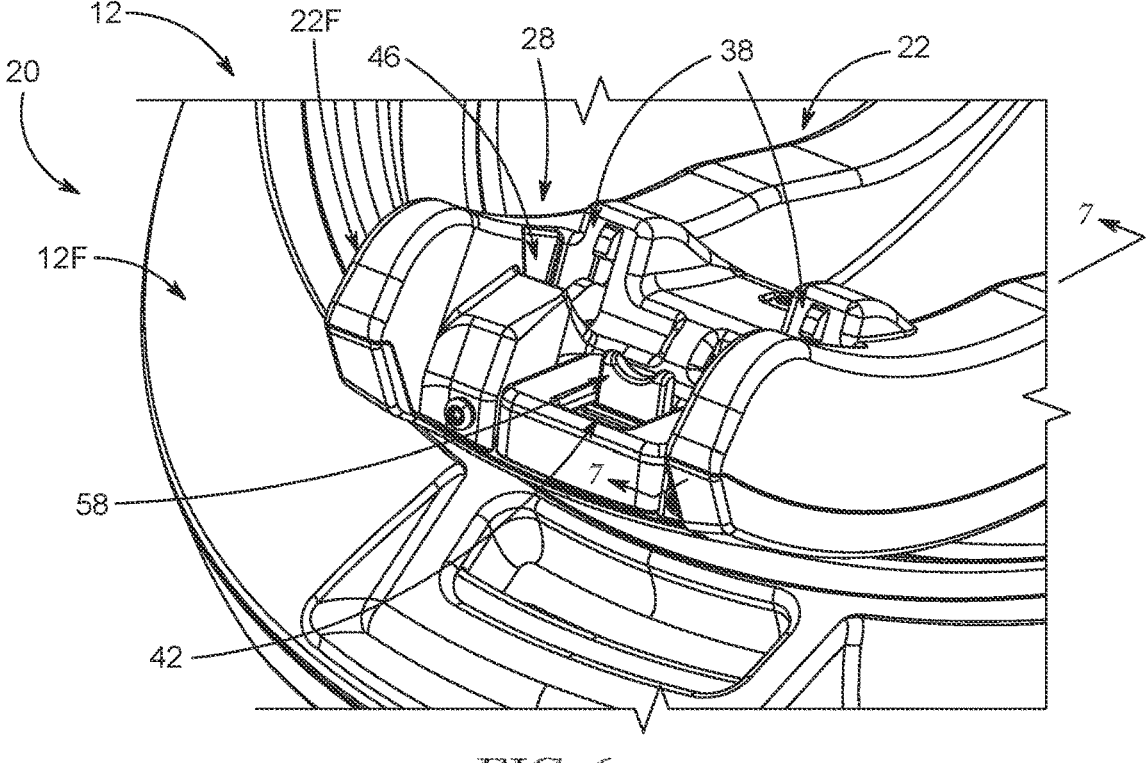
FIG. 6 is an enlarged view of a portion of FIG. 2 showing that the juvenile seat anchor further includes a pair of anchor latched coupled to the seat base and configured to capture the second juvenile seat retainer when the front end of the juvenile seat is lowered onto the seat base as shown in FIG. 8.

The juvenile seat anchor 28 includes a second juvenile-seat retainer 36 coupled to the underside of the juvenile seat 14 and a pair of anchor latches 38 coupled to the front end 14 of the seat orientation controller 28 as shown in FIGS. 5 and 6. The second juvenile-seat retainer 36 includes a pair of u-shaped bars that are sized to capture a respective anchor latch 28 when the front end 14F of the juvenile seat 14 is lowered onto the seat orientation controller 22. The anchor latches 38 are configured to engage the second juvenile-seat retainer 36 when the juvenile seat 14 is installed on the seat base 12. The anchor latches 38 are locked by the anchor lock 30 when the juvenile seat 14 is fully installed on the seat-orientation controller 22 to retain the juvenile seat 14 to the seat base 12.

The anchor lock 30 includes a pair of lock pins 40 coupled to the seat orientation controller 22, a lock-release controller 42 coupled to the pair of lock pins 40, and a release handle 44 coupled to the juvenile seat 14 as shown in FIGS. 2-6. The pair of lock pins 40 are each configured to engage a respective anchor latch 38 in a locked position to block movement of each anchor latch 38 relative to the seat base 12. The lock pins 40 are normally biased to the locked position so that they automatically assume the locked position upon attachment of the juvenile seat 14 to the seat base 12. The lock-release controller 42 is configured to move the lock pins 40 from the locked position to an unlocked position disengaging the anchor latches 38 so that the anchor latches 38 can return to an unlatched position and the juvenile seat 14 can be lifted away from the seat base 12. The release handle 44 is configured to be actuated by a user to move a portion of the lock-release controller 42 relative to the seat base 12 and to cause the latch lock 42 to change from the locked position to the unlocked position.

Figures 7, 8:
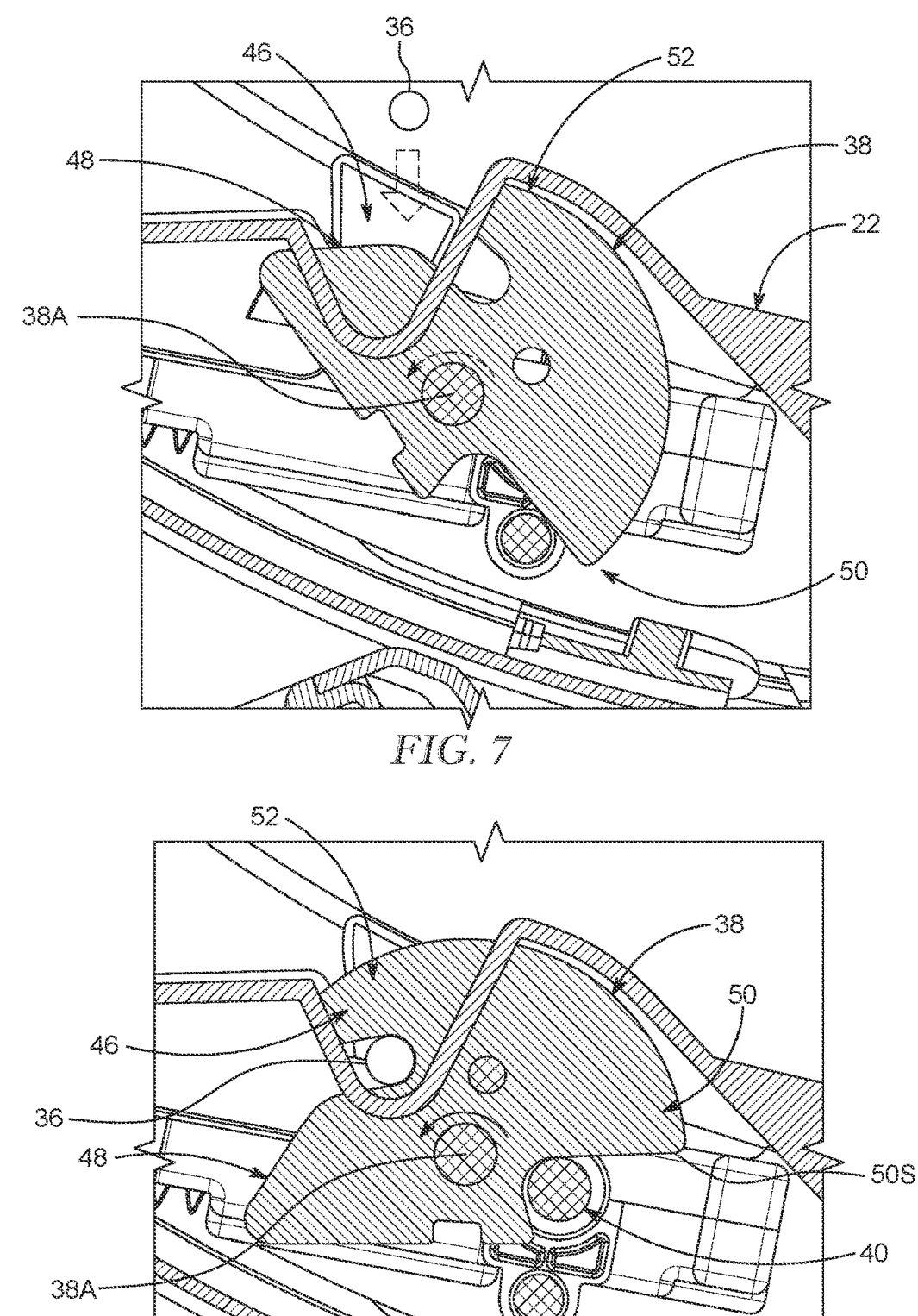
FIG. 7 is a cross section taken along line 7-7 in FIG. 6 showing one of the anchor latches in an unlatched position and showing the second juvenile seat retainer spaced apart from the second juvenile seat retainer prior to the front end of the juvenile seat being lowered onto the seat base.
FIG. 8 is a cross section similar to FIG. 7 showing the anchor latch in a latched position after the second juvenile seat retainer is lowered onto the seat base to reside in a retainer receiving space formed in the seat base adjacent to each of the anchor latches.

Each anchor latch 38 is mounted to a front end 22F of the seat-orientation controller 22 for pivotable movement about a latch pivot axis 38A from an unlatched position, as shown in FIG. 7, to the latched position, as shown in FIG. 8. In the unlatched position, a retainer-receiving slot 46 formed in the seat-orientation controller 22 and is exposed to receive the second juvenile-seat retainer 36 during installation of the juvenile seat 14 on the seat base 12. In latched position, a portion of the anchor latch 38 moves into the retainer-receiving slot 46 to capture the second juvenile-seat retainer 36 in the retainer-receiving slot 46 so that the second juvenile-seat retainer 36 is blocked from being removed from the retainer-receiving slot 46. Each anchor latch 38 is biased to normally assume the unlatched position.

Each anchor latch 38 includes a latch lever 48, a lock receiver 50, and a latch hook 52 as shown in FIGS. 7 and 8. The latch lever 48 is configured to engage the anchor latch 38 as the juvenile seat 14 is installed on the seat base 12 and to cause the anchor latch 38 to pivot from the unlatched position to the latched position. The lock receiver 50 is configured to engage a lock pin 40 when the anchor latch 38 reaches the latched position to block the anchor latch 38 from pivoting unintentionally from the latched position to the unlatched position. The latch hook 52 is removed from the retainer-receiving slot 46 in the unlatched position and pivots with the latch lever 48 to extend into the retainer-receiving slot 46 and block removal of the second juvenile-seat retainer 36 from the retainer-receiving slot 46 in the latched position.

The lock receiver 50 includes a pin bearing surface 50S which engages the lock pin 40 in the latched position as shown in FIG. 8. The lock pins 40 are retractable away from the anchor latches 38 to disengage the pin bearing surface 50S in response to actuation of the release handle 44.

The lock-release controller 42 includes a controller housing 54 coupled to the seat orientation controller 22, a cam plate 56 coupled to the lock pins 40, and a handle mount 58 coupled to the cam plate 54 as shown in FIGS. 9-12. The controller housing 54 houses the cam plate 56 and a portion of the lock pins 40. The cam plate 56 is slidable relative to the controller housing 54 to move each lock pin 40 from the locked position to the unlocked position in response to movement of the cam plate 56 by the release handle 44. The handle mount 58 is configured to engage the release handle 44 when the juvenile seat 14 is installed on the seat base 12 so that movement of the release handle 44 causes simultaneous movement of the cam plate 56 and the lock pins 40. The handle mount 58 is sized to fit within a pocket 45 formed in the release handle 44 as shown in FIG. 5.

The controller housing 54 is formed to include a pair of pin guide slots 60, 62 and a controller guide slot 64 as shown in FIGS. 9 and 10. Each pin guide slot 60, 62 is configured to receive a guide pin 66 included in each lock pin 40. The pin guide slots 60, 62 are substantially parallel with the pivot axis 38A of the anchor latches 38 and the guide pins 66 travel through the guide slots 60, 62 in response to movement of the cam plate 56. The controller guide slot 64 is configured to receive the handle mount 58. The handle mount 58 extends upwardly beyond the controller housing 54 to engage with the release handle 44 when the juvenile seat 14 is installed on the seat base 12. The controller guide slot 64 is arranged substantially perpendicularly to the guide slots 60, 62. The handle mount 58 is configured to move through the controller guide slot 64 in a direction that is substantially perpendicular to the pin guide slots 60, 62 and a direction of travel of each of the lock pins 40 and the pivot axis 38A.

The cam plate 56 is formed to include first and second actuator slots 68, 70 that each receive a respective guide pin 66 of the lock pins 40 as shown in FIGS. 11 and 12. The first and second actuator slots 68, 70 are angled relative to a direction of travel of each lock pin 40 to cause each lock pin 40 to move toward one another when the cam plate 56 is moved in a release direction that is perpendicular to the direction of travel.

The juvenile-seat attachment system 24 is configured to provide means for separating the juvenile seat 14 from the seat base 12 in response to a pulling force on the seat-release handle 44 coupled to the juvenile seat 14 and a lifting force applied on the seat-release handle 44 after application of the pulling force to cause the juvenile seat 14 to unlock from the seat base 12 and at least partially separate from the seat base 12 without a user disengaging the release handle 44 during application of the pulling force and the lifting force. In this way, the juvenile seat 14 can be separated from the seat base 12 without the user having to readjust their hands after application of the pulling force.

The invention claimed is:

1. A child restraint comprising
  a seat base including a seat foundation adapted to rest on a vehicle seat and a seat-orientation controller coupled to the seat foundation and configured to move relative to the seat foundation,
  a juvenile seat adapted to support a child, the juvenile seat including a seat bottom and a seat back arranged to extend upwardly away from the seat bottom, and a juvenile-seat attachment system configured to mount the juvenile seat releasably to the seat base so that the juvenile seat is at least partially separable from the seat base,
  wherein the juvenile-seat attachment system includes an installation guide configured to guide a rear end of the juvenile seat onto the seat-orientation controller so that a front end of the juvenile seat is aligned with a front end of the seat-orientation controller for proper installation, a juvenile seat anchor configured to retain the front end of the juvenile seat to the seat-orientation controller after the front end of the juvenile seat is lowered onto the seat-orientation controller, and an anchor lock configured to retain the juvenile seat anchor in a latched position to block separation of the juvenile seat from the seat base after the front end of the juvenile seat is installed on the seat-orientation controller.

2. The child restraint of claim 1, wherein the installation guide includes a first juvenile-seat retainer coupled to an underside of the juvenile seat and a guide post coupled to a topside of the seat-orientation controller and configured to engage the first juvenile-seat retainer when the rear end of the juvenile seat is installed on the seat base.

3. The child restraint of claim 2, wherein the first juvenile-seat retainer includes a first u-shaped retainer bar and a second u-shaped retainer bar spaced apart from the first u-shaped retainer bar.

4. The child restraint of claim 2, wherein the juvenile seat anchor includes a second juvenile-seat retainer coupled to the underside of the juvenile seat and an anchor latch configured to engage the second juvenile-seat retainer when the juvenile seat is installed on the seat base and to retain the juvenile seat to the seat base.

5. The child restraint of claim 4, wherein the anchor latch includes a latch hook that is mounted to a front end of the seat-orientation controller for pivotable movement about a latch pivot axis from an unlatched position exposing a retainer-receiving slot formed in the seat-orientation controller and sized to receive the second juvenile-seat retainer and a latched position closing the retainer-receiving slot.

6. The child restraint of claim 5, wherein the latch hook is configured to move from the unlatched position to the latched position in response to the second juvenile-seat retainer contacting the latch hook during installation.

7. The child restraint of claim 6, wherein the anchor lock includes a lock pin that is configured to move from an unlocked position to a locked position, blocking movement of the latch hook from the latched position to the unlatched position, when the latch hook changes from the unlatched position to the latched position.

8. The child restraint of claim 4, wherein the anchor lock includes a lock pin configured to engage the anchor latch in a locked position engaging the anchor latch to block movement of the anchor latch relative to the seat base, a lock-release controller coupled to the seat-orientation controller and to the lock pin and configured to move the lock pin from the locked position to an unlocked position disengaging the anchor latch, and a release handle coupled to the juvenile seat and configured to be actuated by a user to move the lock-release controller relative to the seat base to cause the latch lock to change from the locked position to the unlocked position.

9. The child restraint of claim 8, wherein the juvenile seat and the seat-orientation controller are rotatable in unison relative to the seat-base foundation about a vertical rotation axis to arrange the juvenile seat in a forward seating arrangement or a rearward seating arrangement.

10. The child restraint of claim 8, wherein the lock-release controller includes a cam plate coupled to the lock pin and configured to move the lock pin from the locked position to the unlocked position in response to movement of the lock-release controller by the release handle and a handle mount configured to engage the release handle when the juvenile seat is installed on the seat base so that movement of the release handle causes simultaneous movement of the cam plate.

11. The child restraint of claim 10, wherein the cam plate is formed to include a first actuator slot that receives a portion of the lock pin and a second actuator slot that receives a portion of a second lock pin included in the anchor lock.

12. The child restraint of claim 11, wherein the first and second actuator slots are angled relative to a direction of travel of each lock pin to cause each lock pin to move toward one another when the lock release-controller is moved in a release direction that is perpendicular to the direction of travel.

13. A child restraint comprising a seat base including a seat foundation adapted to rest on a vehicle seat, a seat-orientation controller coupled to the seat foundation and configured to move relative to the seat foundation, and a retainer unit coupled to the seat orientation controller for movement therewith, a juvenile seat adapted to support a child, the juvenile seat including a seat bottom, a seat back arranged to extend upwardly away from the seat bottom, and an anchor unit configured to engage the retainer unit of the seat base to mount and retain the juvenile seat to the seat base, and a juvenile-seat release unit configured to disengage the retainer unit from the anchor unit so that the juvenile seat is at least partially separable from the seat base, the juvenile-seat release unit including a retainer lock coupled to the seat-orientation controller and configured to retain the retainer unit in a locked position upon installation of the juvenile seat on the seat base, a lock-release controller coupled to the seat-orientation controller and to the retainer lock and configured to release the retainer lock from the retainer unit to change the retainer unit from the locked position to an unlocked position, and a release handle coupled to the juvenile seat and arranged to engage the lock-release controller when the juvenile seat is attached to the seat base.

14. The child restraint of claim 13, wherein the release handle is coupled to the seat bottom at a front end of the juvenile seat and is configured to be pulled in a forward direction by a user to move the lock-release controller and cause the retainer lock to release from the retainer unit.

15. The child restraint of claim 14, wherein the release handle includes a handle grip configured to be engaged by the user and a handle extension coupled to the handle grip and configured to engage the lock-release controller when the juvenile seat is fully installed on the seat base.

16. The child restraint of claim 14, wherein the release handle is arranged to lie on an underside of the seat bottom so that the user can apply a pulling force on the release handle in a forward direction relative to the juvenile seat and a lifting force on the release handle in an upward direction away from the seat base to at least partially separate the juvenile seat from the seat base.

17. The child restraint of claim 13, wherein the anchor unit includes a first juvenile-seat anchor coupled to an underside of the juvenile seat and a second juvenile-seat anchor coupled to the underside of the juvenile seat and spaced apart from the first juvenile-seat anchor, and wherein the retainer unit includes a first anchor retainer coupled to a front end of the seat-orientation controller and configured to engage the first juvenile-seat anchor and a second anchor retainer coupled to a rear end of the seat-orientation controller and configured to engage the second juvenile-seat anchor.

18. The child restraint of claim 17, wherein the first anchor retainer is pivotable about a retainer pivot axis from the unlocked position when the juvenile seat is separated from the seat base to the locked position when the juvenile seat is installed on the seat base, and the second anchor coupled to the seat-orientation controller in a fixed position relative to the seat-orientation controller and is configured to guide installation of the juvenile seat onto the seat orientation controller.

19. A child restraint comprising a seat base including a seat foundation adapted to rest on a vehicle seat and a seat-orientation controller coupled to the seat foundation and configured to move relative to the seat foundation, a juvenile seat adapted to support a child, the juvenile seat including a seat bottom and a seat back arranged to extend upwardly away from the seat bottom, and a juvenile-seat attachment system configured to mount the juvenile seat to the seat base, wherein the juvenile-seat attachment system is configured to provide means for separating the juvenile seat from the seat base in response to a pulling force on a seat-release handle coupled to the juvenile seat and a lifting force applied on the seat-release handle after application of the pulling force to cause the juvenile seat to unlock from the seat base and separate from the seat base without a user disengaging the release handle during application of the pulling force and the lifting force.

20. The child restraint of claim 19, wherein the juvenile-seat attachment system includes an installation guide configured to guide a rear end of the juvenile seat onto the seat-orientation controller so that a front end of the juvenile seat is aligned with a front end of the seat-orientation controller for proper installation, a juvenile seat anchor configured to engage the front end of the juvenile seat after the front end of the juvenile seat is lowered onto the seat-orientation controller, and an anchor lock configured to retain the juvenile seat anchor in a locked position to block separation of the juvenile seat from the seat base after the front end of the juvenile seat engages the juvenile seat anchor.

* * * * *